United States Patent
Choiniere et al.

(10) Patent No.: US 10,902,259 B2
(45) Date of Patent: Jan. 26, 2021

(54) HYPERSPECTRAL NAVAL TARGET DETECTION

(71) Applicant: BAE SYSTEMS Information and Electronic Systems Integration Inc., Nashua, NH (US)

(72) Inventors: Michael J. Choiniere, Merrimack, NH (US); Kenneth Dinndorf, Bedford, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 94 days.

(21) Appl. No.: 16/163,764

(22) Filed: Oct. 18, 2018

(65) Prior Publication Data
US 2020/0125821 A1   Apr. 23, 2020

(51) Int. Cl.
*G06K 9/00* (2006.01)
*G06K 9/62* (2006.01)
*B64C 39/02* (2006.01)

(52) U.S. Cl.
CPC ......... *G06K 9/0063* (2013.01); *B64C 39/024* (2013.01); *G06K 9/00637* (2013.01); *G06K 9/6224* (2013.01); *B64C 2201/127* (2013.01); *G06K 2009/00644* (2013.01)

(58) Field of Classification Search
CPC ............... G06K 9/0063; G06K 9/6224; G06K 2009/00644; B64C 39/024; B64C 2201/127
See application file for complete search history.

(56) References Cited

U.S. PATENT DOCUMENTS

| | | | |
|---|---|---|---|
| 8,094,886 B1* | 1/2012 | Roskovensky | G06K 9/0063 382/103 |
| 2016/0148390 A1* | 5/2016 | Arambel | G06K 9/0063 382/103 |
| 2018/0266886 A1* | 9/2018 | Frank | G01J 5/007 |
| 2019/0195689 A1* | 6/2019 | McQuilkin | G01N 21/31 |

* cited by examiner

*Primary Examiner* — Zhitong Chen
(74) *Attorney, Agent, or Firm* — KPIP Law, PLLC; Scott J. Asmus (57) ABSTRACT

The system and method of detecting targets using a camera comprising narrow band filters in a compact pixel cluster arrangement. In some cases, the target is a chemical target. In some cases, the target is a naval target and the processing of the data provides extent, shape, direction and other characteristics that can provide details about the type of naval target even in dark or low light conditions.

18 Claims, 7 Drawing Sheets

---

Capturing image scene onto sensor array equipped with pixel narrow band filters for target and/or material detection (50)

↓

Image is captured by the ROIC and sent to the processor (52)

↓

Processor generates the sub-pixel processing looking for threshold ratios to declare presence of the targeted material properties (54)

↓

Apply spatial filtering to the pixel sub-clusters, remove noise and apply spatial library forms to declare target detection (56)

HYPERSPECTRAL NAVAL TARGET DETECTION

FIELD OF THE DISCLOSURE

The present disclosure relates to target detection and more particularly to the detection of naval targets in low light and/or nighttime conditions.

BACKGROUND OF THE DISCLOSURE

The current method for detecting and tracking surface vessels relies on standard imagers (e.g., visible, SWIR, MWIR and LWIR) seeing the vessel. The MWIR and LWIR imagers typically track the thermal signature of the boat. If the goal is to track smaller attack boats, the thermal signature is small given the size of the vessel and can be masked using heat shields on the out board motors, for example. At night, the visible camera has limited utility due to limited ambient lighting, and even the SWIR camera using the night glow on a cloudy day, the contrast will be too poor when looking for the boat directly. The wake however is extremely bright, relatively speaking, and is typically large and wide making a more cooperative target to detect and track. Wherefore it is an object of the present disclosure to overcome the above-mentioned shortcomings and drawbacks associated with the conventional naval target tracking.

SUMMARY OF THE DISCLOSURE

One aspect of the present disclosure is a system comprising a SWIR imager with a 2 by 2 pixel cluster having four unique band pass filters. The 2 by 2 pixel cluster forms the basis for a hyperspectral measurement for determining the presence of white water in the ocean which has been formed by a boat wake. The optical imager consisting of an optical lens, an imager with the embedded narrow pixel filter array, and processing elements can be utilized for wake detection.

One aspect of the present disclosure system for target detection, comprising: a camera equipped with narrow band filters in a compact pixel cluster; an image processor for processing an image from the camera for target detection by comparing ratios between pixel measurements using narrow band filters in the compact pixel cluster; and a processor configured to determine shape, extent or other characteristics of a target's signature.

One embodiment of the system for target detection is wherein the target's signature is wake and the target is a naval target. In certain embodiments the camera is an SWIR camera.

Another embodiment of the system for target detection further comprises a scanner to increase the field of regard of the system. Some embodiments of the system for target detection further comprise a drone to increase search area of the system. In some cases the target is a chemical target.

Another aspect of the present disclosure is a method of target detection, comprising: capturing an image on a camera equipped with narrow band filters in a compact pixel cluster; sending the image to a processor configured to analyze the compact pixel cluster; determining if a target is present by comparing ratios between pixel measurements using narrow band filters in the compact pixel cluster; and spatially processing image data for characteristics including form, shape, motion, and/or direction of the target.

One embodiment of the method for target detection is wherein the target is a naval target. In certain embodiments the camera is an SWIR camera.

Another embodiment of the method for target detection further comprises a scanning with the camera to increase the field of regard of the system. Yet another embodiment of the method for target detection further comprises a providing the camera on a drone to increase search area.

Still yet another embodiment if the method for target detection is wherein the target is a chemical target.

One embodiment of the method for target detection further comprises removing clutter including white caps in a lowlight image. In some cases, white caps present as an extent of about 5 to 10 meters and moving in the same direction. In certain embodiments, a declared cluster of data is further processed for shapes in a boat wake format, including extent, V shape, direction and/or speed.

Certain embodiments of the method for target detection further comprise comparing results of further processing to determine a type of naval target.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

In a naval environment, target detection systems typically look for a watercraft. Watercraft can be relativity small and may even be camouflaged. In lowlight or nighttime conditions these targets are even more difficult to identity. However, as described herein, a watercraft's wake is a highly reflective target and is always present.

Figure 2:
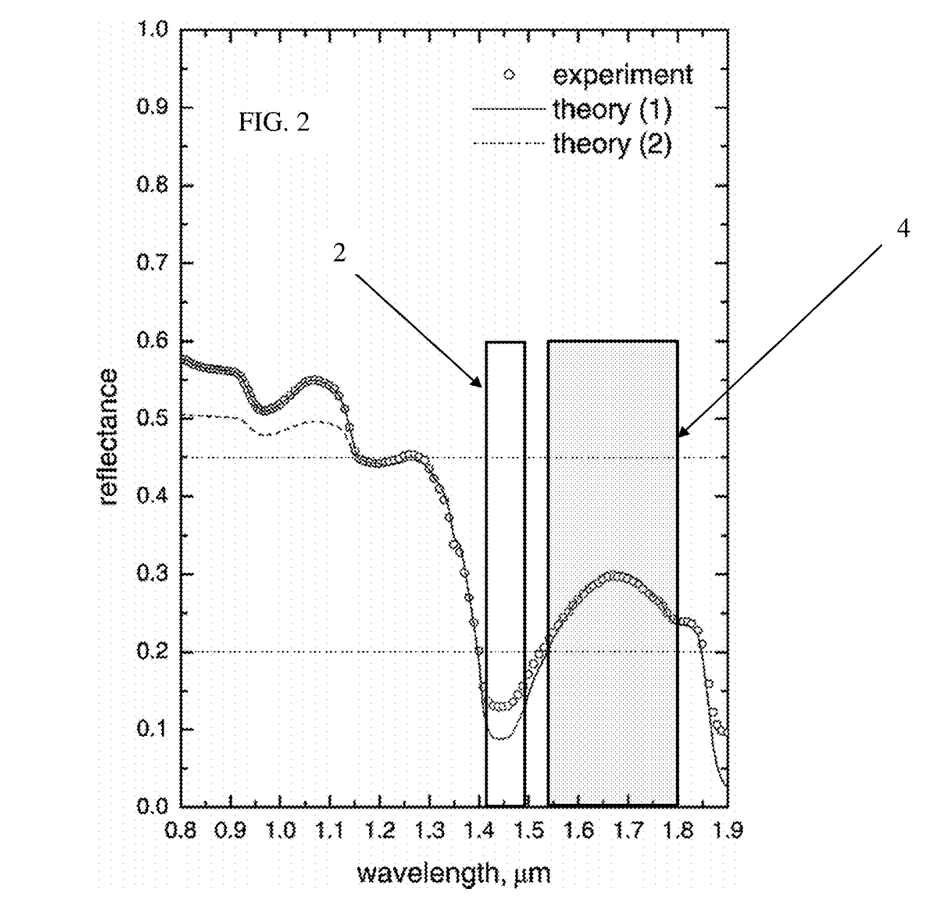
FIG. 2 is a graph of night sky reflectance over wavelengths ranging from short wave infrared to visible showing white water reflectance.
Figure 3A:
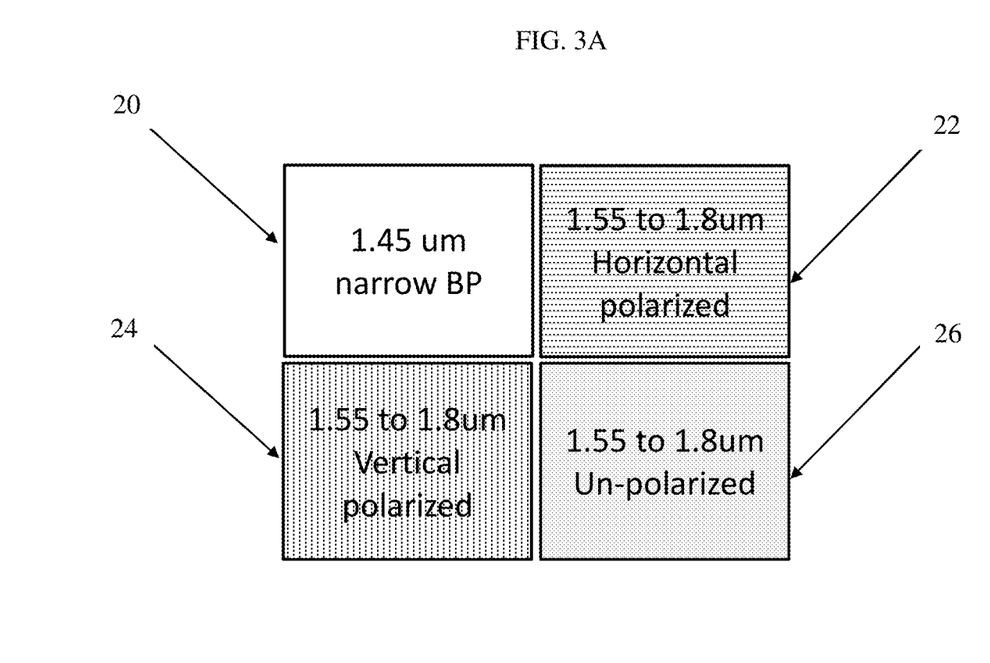
FIG. 3A is a diagram of one embodiment of a two pixel by two pixel detection system according to the principles of the present disclosure.
Figure 3B:
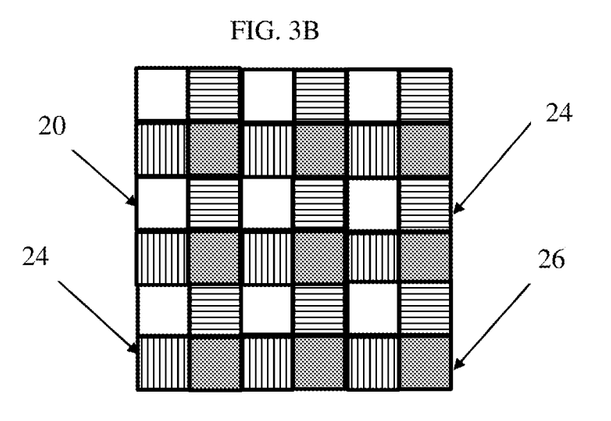
FIG. 3B is a diagram of one embodiment of a pixel array according to the principles of the present disclosure using the layout as shown in FIG. 3A.

In one embodiment of the present disclosure, a high contrast system is used for the detection of naval targets, even in low light and/or nighttime conditions. Any ambient lighting, See, e.g., FIG. 1 will be subject to the lighting distribution presented herein. At 1.45 um, a dip in the lighting conditions and contrast is shown and a peak at 1.8 um, represents ~10× differential in contrast. In FIG. 2, the same band amplifies the sample contrast by an additional ~10×. due to the difference in white water vs standard water. These two effects amplify the contrast to ~100×. By imaging with a 2 by 2 pixel cluster, as depicted in FIG. 3A and FIG. 3B and as processed in FIG. 3C, the modulated waveform presented in FIG. 4 can be measured. The modulated contrast wave form from each pixel cluster set becomes the signal of interest for use in wake detection. In certain embodiments, the number of pixel clusters that indicate a wake determines the size of the wake within the image. Further processing can look at the size, the velocity (frame to frame) and the direction of the wake to determine the size and the class of the vessel. In some cases, the combination of the wake confirmation via hyperspectral detection and the wake size and shape (spatial) determination greatly enhances the detection of Naval vessels.

In certain embodiments of the naval detection system, the short-wave infrared (SWIR) band is used. The SWIR band utilizes reflected ambient light which is typically SNR starved during night operations. The contrast signature of a watercraft is typically poor against the water. However, a more prominent target is the wake formed by the target naval vessel. Typically, wake is extremely reflective even in the SWIR band.

Figure 1:
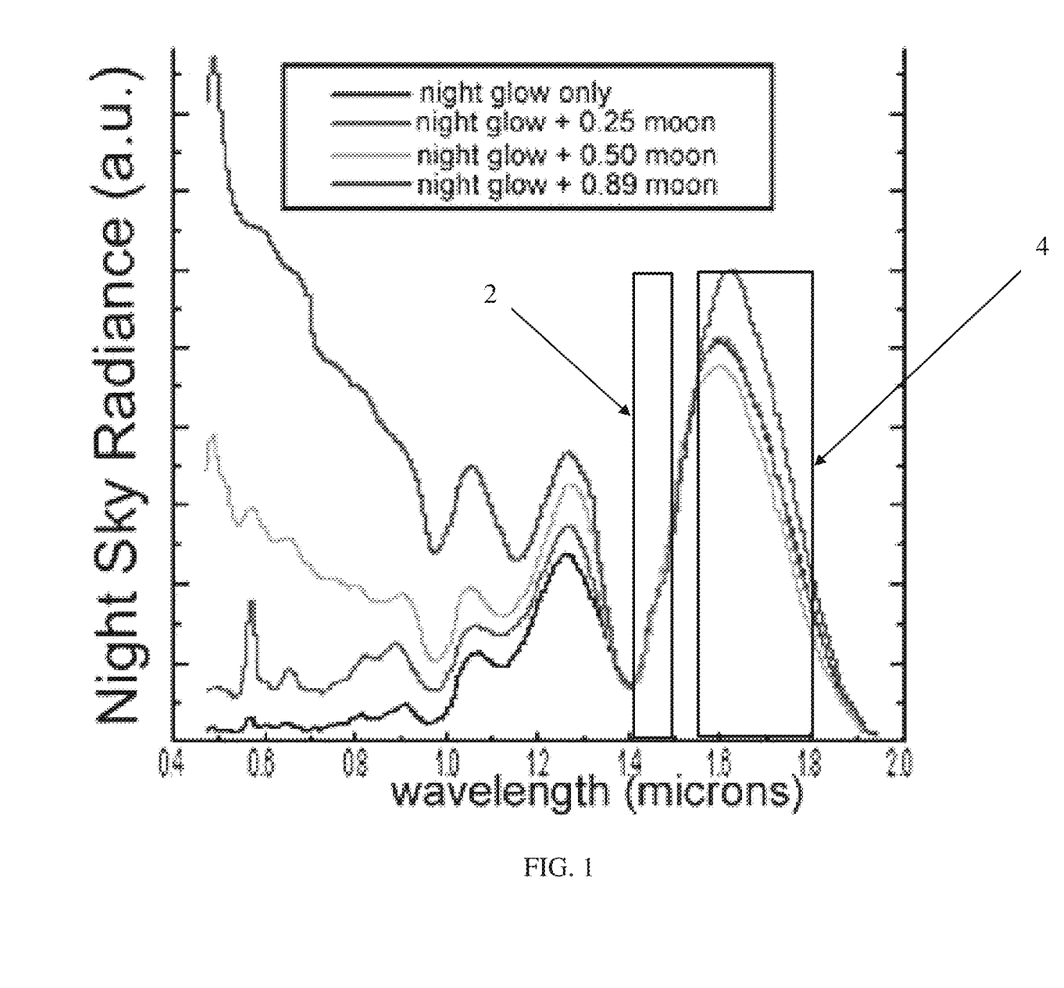
FIG. 1 is a graph of night sky radiance over wavelengths ranging from short wave infrared to visible under different phases of the moon.

Referring to FIG. 1, a graph of night sky radiance plotted against wavelengths ranging from short wave infrared (SWIR) to visible under different phases of the moon is shown. More specifically, the visible range is 0.4 µm to 0.7 µm, near infrared is from 0.7 inn to 1.0 µm, and SWIR is from 1.0 µm to about 2.7 µm. Under different moonlit conditions ranging from night glow only to 0.89 moon (a nearly full moon), the radiance in the visible range varies greatly. However, at about 1.4 µm-1.5 µm (2) there is a consistent dip in radiance regardless of the phase of the moon. This range is used as a reference signal, representing a noise floor 2. In the range of about 1.55 µm to about 1.8 µm (4) there is a larger amount of radiance regardless of the phase of the moon. This range is used as the source of the signals to be detected 4.

Referring to FIG. 2, a graph of night sky reflectance over wavelengths ranging from short wave infrared to visible showing white water reflectance is shown. More specifically, the figure corresponds to the light reflection of white water/wake as a function of wavelength. In one embodiment, by using the two filter bands identified in FIG. 1, and convolving the reflective responses illustrated in FIG. 2, a high contrast system can be designed to detect targets even in low-light and/or nighttime conditions.

Referring to FIG. 3A, a diagram of one embodiment of a two pixel by two pixel target detection system according to the principles of the present disclosure is shown. More specifically, the 2×2 detector comprises a background pixel associated with a 1.45 narrow bandpass filter for use as a reference signal 20. There are three additional pixels in the 1.55 µm to 1.8 µm range that are devoted to target signal detection. One pixel is vertically polarized 24, one is horizontally polarized 22, and the third pixel is not polarized 26. As shown in FIG. 3B, a diagram of one embodiment of a pixel array according to the principles of the present disclosure using the layout as shown in FIG. 3A is repeated across an array of pixels.

In one embodiment of the system a 2 by 2 pixel set is used. In others a 3 by 3 or a 2 by 3 may also be used depending on how many bands/line widths are needed to yield the result. The determination of the number bands/linewidths is dependent on the number of ratios/comparisons needed to declare target ID; in this case a wake. The present 2×2 solution, as shown in FIG. 3A and FIG. 3B, is analogous to a Bayer color pattern, except the present pattern consists of one filter at 1.45 µm as a noise floor reference, and three at 1.55 µm to 1.8 µm with polarizers: 1) horizontal, 2) vertical, and 3) un-polarized (signal) for day operation, and sun glint reduction. During the night, the ratio of pixel 20 and pixel 26 maybe sufficient for wake detection. This represents the highest level of contrast. During the daytime, however, other sources of light can provide clutter and using one or both of the polarized pixels, 22 or 24, reduces solar glint depending on the roll orientation of the seeker. In one embodiment, the addition of further spatial processing of the detected clutter allows white caps to appear smaller than a wake and thereby can be filtered.

Figure 3C:
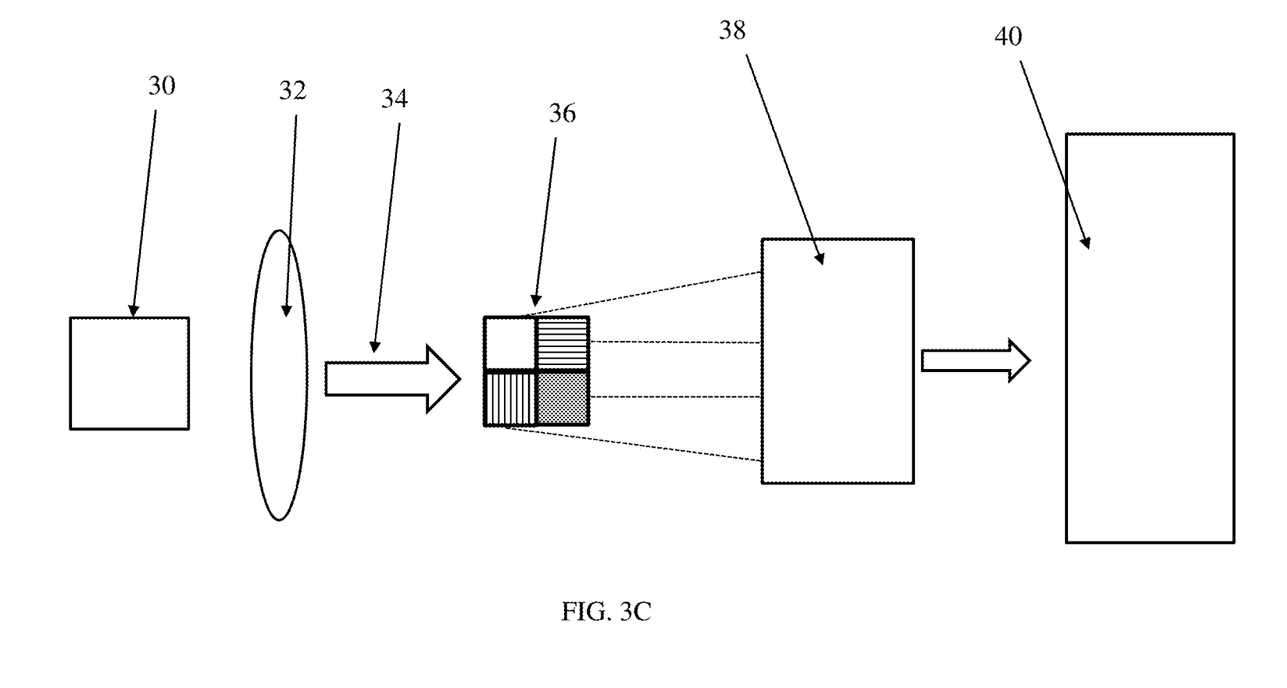
FIG. 3C represents one embodiment of the system where the surveillance engagement area is imaged on a standard camera equipped with hyperspectral narrow band filters arranged in a 2 by 2 pixel cluster.

Referring to FIG. 3C, one embodiment of the system where the surveillance engagement area is imaged on a standard camera equipped with hyperspectral narrow band filters arranged in a 2 by 2 pixel cluster is shown. More specifically, an area being viewed 30 is collected via at least one lens 32 and the image 34 is projected onto at least one cluster 36. In this embodiment it is a 2 by 2 cluster as described in FIG. 3A and FIG. 3B. The signals detected by the array 36 are then processed in a ROIC using a standard camera readout 38. In one embodiment, a processor 40 compares signal levels among the 2 by 2 pixel cluster for the presence of white water.

Figure 4:
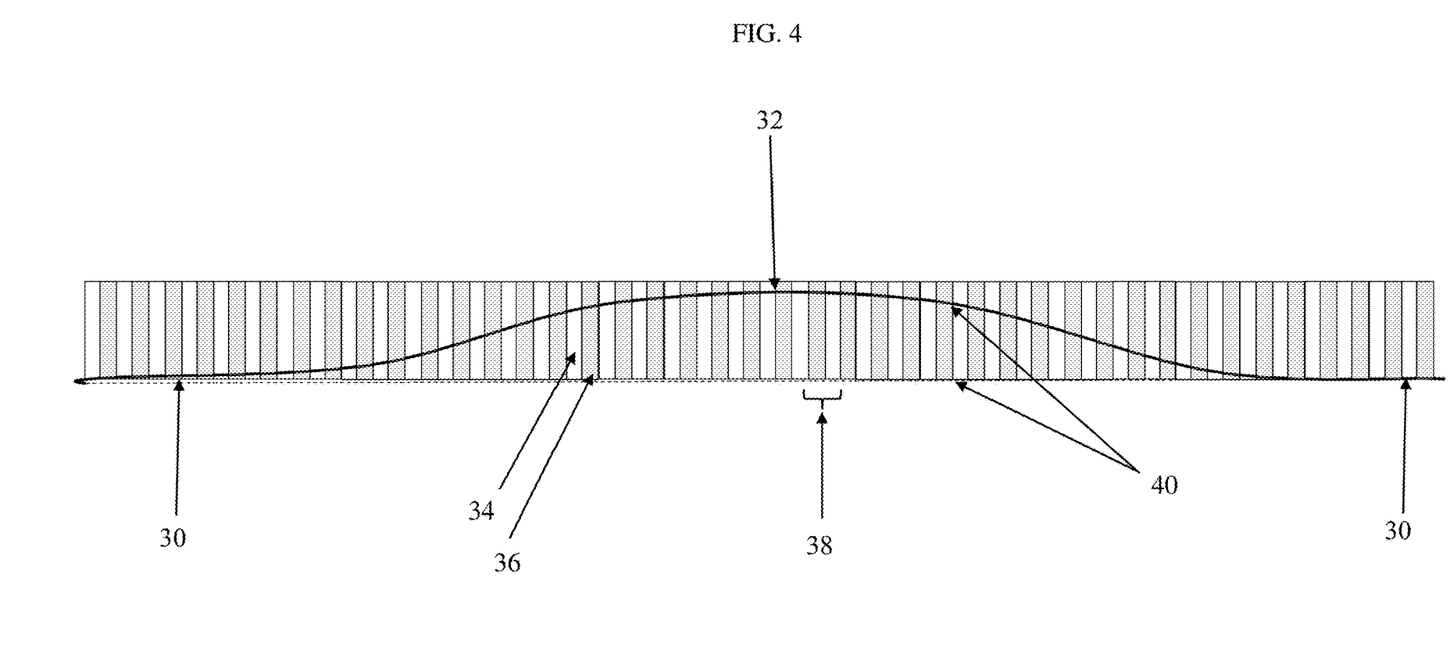
FIG. 4 is a diagram of one embodiment of processing for the detection of wake according to the principles of the present disclosure.

Referring to FIG. 4, a diagram of one embodiment of the processing output for the detection of wake according to the principles of the present disclosure is shown. More specifically, a plot of wake detection is shown, such that there is no wake 30 at either end of a curve and the wake is shown as a long rolling signature with a peak 32 at about 2-3 SNR. By having the narrow bandpass signal 34 as a noise floor reference this allows for immediate local domain noise floor measurement. When this background signal is used with the target signal data 36, this imposes a mosaic across the wake where a combination of spatial 36 and low SNR 34 values can be grouped 38 and used as a detection method. The repetitive signals between the filters and over a large area define a wake as an amplitude 40. A secondary filtering process would look at the shape and configuration of the pixel clusters that declare white is present. For example, white caps are orientated, moving in the same direction and are roughly the same size. A spatial algorithm can be generated to detect and remove white caps from the image. In contrast, a wake tends to be in a V shape and is reasonably isometric. Depending on a parameter set, the wake can be identified, classified, and its direction and velocity can be determined. This information can be utilized to determine the probability of an actual wake and the class of vessel that produced it.

In certain embodiments of the present disclosure, the approach looks for large low level signatures, like a wake from a watercraft or naval ship. In other embodiments, the system could be used for passive chemical detection such a gas detectors where the background imagery is used and decomposed into multiple narrow band markers relative to another, or full spectrum, response. Analogous to the wake detection, a gas has transmission and absorption lines from sun light. By picking the correct absorption lines and transmission lines, filters on the sensor array can be tailored to provide high contrast between adjacent pixels. The cluster becomes self-calibrating since the unfiltered pixel reads the energy the object (can be any color) and the filtered pixel will see the absorption line reading a lower value (if gas is present) as compared to the unfiltered pixel. By selecting a number of lines, the camera can be designed to detect several gas line of interest. By using a simple spatial filtering, single cluster detection can be flagged as an anomaly where several clusters in the same vicinity constitute a determination.

Figure 5:
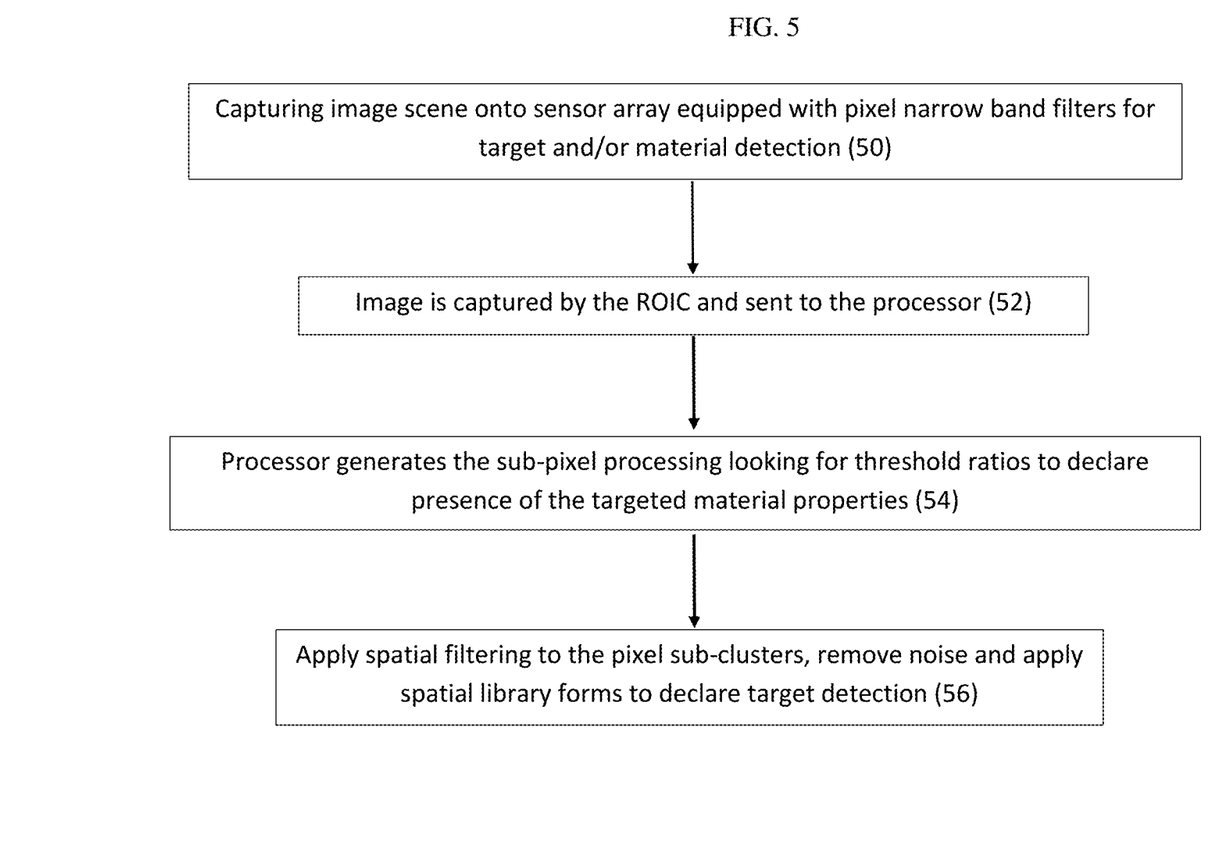
FIG. 5 is a flowchart of one embodiment of a method according to the principles of the present disclosure.

Referring to FIG. 5, a flowchart of one embodiment of a method according to the principles of the present disclosure is shown. More specifically, an imager equipped with narrow band filters is designed to capture the target scene and the hyperspectral response of the intended target 50. The image is then captured by a ROIC and sent to a processor for threshold ratio analyses 52. The threshold analysis compares ratios of the pixel subgroup for the presence of the intended target. If a threshold ratio is exceeded, then the sub-pixel group would declare a target signature present 54. The presence of a singular pixel group is then subjected to spatial filtering to distinguish between a false alarm verses a spatial extent that is characteristic of the target 56. For example a vessel wake may require a minimum count or 5 pixel groups in a V formation or as many as 30, depending on the nature of the target. In certain embodiments, the higher the level of threshold and the spatial number drives false alarm rates lower at the expense of possible lower detection statistics.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A system for target detection, comprising:
    a SWIR camera optically coupled to a plurality of narrow band filters to provide signals to a compact pixel cluster;
    an image processor for processing a single image from the SWIR camera for the target detection by comparing ratios between pixel measurements in the compact pixel cluster; and
    a processor configured to determine shape, extent or other characteristics of a target, wherein the characteristics are from a wake of the target.

2. The system for target detection according to claim 1, wherein the target is a naval target.

3. The system for target detection according to claim 1, further comprising a scanner to increase a field of regard of the system.

4. The system for target detection according to claim 1, further comprising a drone to increase a search area of the system.

5. A method of target detection, comprising:
    capturing a single image on a SWIR camera equipped with narrow band filters in a compact pixel cluster, wherein one of the narrow band filters establishes a relative noise floor and remaining filters provide signals to the compact pixel cluster;
    sending the image to a processor configured to analyze the compact pixel cluster;
    determining if a target is present by comparing ratios between pixel measurements using the signals from the remaining narrow band filters in the compact pixel cluster; and
    spatially processing image data for characteristics including form, shape, motion, and/or direction of the target.

6. The method for target detection according to claim 5, wherein the target is a naval target.

7. The method for target detection according to claim 5, further comprising scanning with the camera to increase the field of regard of the system.

8. The method for target detection according to claim 5, further comprising providing the camera on a drone to increase search area.

9. The method for target detection according to claim 5, wherein the target is a chemical target.

10. The method for target detection according to claim 5, further comprising removing clutter including white caps in a lowlight image.

11. The method for target detection according to claim 10, wherein white caps present as an extent of about 5 to 10 meters and moving in the same direction.

12. The method for target detection according to claim 5, wherein a declared cluster of data is further processed for shapes in a boat wake format, including extent, V shape, direction and/or speed.

13. The method for target detection according to claim 12, further comprising comparing results of further processing to determine a type of naval target.

14. A target detection system, comprising:
a single lens;
a plurality of filters optically coupled to the single lens;
a SWIR camera optically coupled to the filters and configured to provide a pixel cluster of a target scene with at least one pixel to each of the filters;
an image processor for processing a single image of the target scene from the SWIR camera and comparing ratios between pixel measurements to determine at least one signature of a target in the target scene, wherein the signature is from a wake of the target.

15. The target detection system according to claim 14, wherein the filters comprise a narrowband filter, a non-polarized filter, a vertical polarized filter and a horizontal polarized filter.

16. The target detection system according to claim 15, wherein the narrowband filter is at about 1.45 micron, and the non-polarized filter, the vertical polarized filter and the horizontal polarized filter are each about 1.55 to 1.8 micron.

17. The target detection system according to claim 14, wherein the narrowband filter establishes a noise floor reference and the non-polarized filter, the vertical polarized filter and the horizontal polarized filter are signals to determine the signatures of the target.

18. The target detection system according to claim 14, wherein the pixel cluster is 2 by 2 pixels, 3 by 3 pixels or 2 by 3 pixels.

* * * * *